Oct. 11, 1932.   A. R. FINCH   1,881,428
STAND FOR SUPPORTING COFFEEPOTS
Filed Dec. 31, 1929
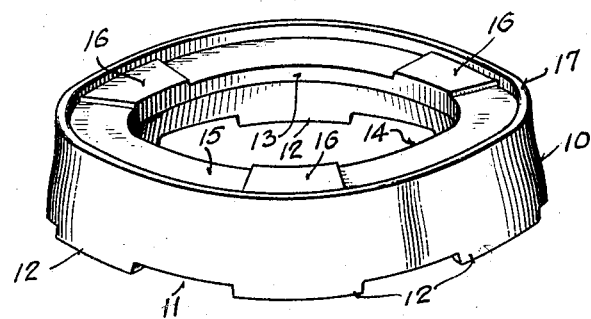
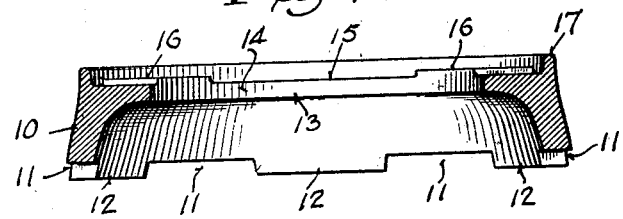
INVENTOR.
Arnold R. Finch
BY
ATTORNEY.

Patented Oct. 11, 1932

1,881,428

UNITED STATES PATENT OFFICE

ARNOLD R. FINCH, OF WEST BEND, WISCONSIN, ASSIGNOR TO WEST BEND ALUMINUM COMPANY, OF WEST BEND, WISCONSIN, A CORPORATION OF WISCONSIN

STAND FOR SUPPORTING COFFEEPOTS

Application filed December 31, 1929. Serial No. 417,760.

My invention relates to stands for supporting coffee pots, and resides in an improved construction of an article formed from insulating material, and pressed into the desired shape while such material is in a plastic condition.

The article comprising the stand is adapted to rest on a table and to support a coffee pot on the upper side thereof, such article serving as an effective insulator, to prevent disfigurement of the table by the heat passing from the coffee pot.

Having thus outlined the nature and purposes of my invention, I will hereinafter describe the details of construction, and point out its novelty in the appended claim.

In the accompanying drawing:

Figure 1 is a perspective view of my improved stand, in a form conveniently adapted to its manufacture.

Fig. 2 is a transverse view in a central vertical plane showing the structural features of my invention.

In the drawing, the numeral 10 indicates the circular wall of the stand, such wall being disposed in a substantially vertical plane. The lower edge of the said wall is transversely notched, as at 11, at a plurality of spaced points in the circumference of the wall so as to provide a like plurality of intervening feet 12, which are adapted to rest upon the table. Inwardly extending from the said wall in a horizontal plane and near the top thereof, is an annular shelf 13, provided centrally with a large opening 14, and having generally an unbroken upper plane surface 15, but provided at widely spaced points with a small number of embossments 16, rising slightly above the said surface, three of such embossments 16 being sufficient for the purposes of my invention. The said embossments 16 serve to support the bottom of the coffee pot clear of the plane surface 15 of the stand, and by reducing greatly the area of contact between the bottom of the coffee pot and the stand, permit the free circulation of air through the existing openings between the embossments 16, with the result that heat in a minimum degree is transmitted to the stand, due to the air-insulation thus provided.

The wall 10 of the stand is provided at its top with a ring 17, rising a short distance above the embossments 16, and such ring 17 serves to position the coffee pot axially with respect to the stand.

In producing my invention, I utilize a composition of insulating material, and shape the same into an integral article by pressing a mass of such material while in a plastic state into dies of appropriate contour. The contour lines of the stand are specially ascertained so as to simplify the cutting of the dies, and render the product an article of easy and economical manufacture.

Having thus described my invention, what I claim and desire to secure by Letters Patent of the United States, is:

As an article of manufacture, a coffee pot stand composed of insulating material, such stand having an approximately vertical circular wall with an inwardly extending annular shelf near the top thereof provided with a central opening therein, and having spaced embossments upon its upper surface for supporting a coffee pot, with clear spaces between such embossments to provide air-insulation, and a ring surmounting the wall and rising above the said embossments, to position the coffee pot axially with respect to the stand.

In testimony whereof I have signed my name at West Bend, this 5th day of December, 1929.

ARNOLD R. FINCH.